United States Patent
Hsu et al.

(10) Patent No.: US 10,061,968 B2
(45) Date of Patent: Aug. 28, 2018

(54) METHOD FOR ASSEMBLING FINGERPRINT IDENTIFICATION MODULE AND FINGERPRINT SENSOR CUTTING METHOD

(71) Applicant: Primax Electronics Ltd., Taipei (TW)

(72) Inventors: Mao-Hsiu Hsu, Taipei (TW); Hsin-Tso Chen, Taipei (TW); Ying-Chieh Chuang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 18 days.

(21) Appl. No.: 15/367,869

(22) Filed: Dec. 2, 2016

(65) Prior Publication Data

US 2018/0075281 A1    Mar. 15, 2018

(30) Foreign Application Priority Data

Sep. 14, 2016 (TW) .............................. 105130008 A

(51) Int. Cl.
*G06K 9/20* (2006.01)
*G06K 9/00* (2006.01)

(52) U.S. Cl.
CPC ..... *G06K 9/00087* (2013.01); *G06K 9/00013* (2013.01)

(58) Field of Classification Search
CPC ...... G06K 9/00013–2009/0006; H01L 21/784; H01L 2221/68327–2221/68336
See application file for complete search history.

(56) References Cited

U.S. PATENT DOCUMENTS

| | | | | |
|---|---|---|---|---|
| 5,991,434 | A * | 11/1999 | St. Onge | G06T 7/0006 382/146 |
| 2009/0230487 | A1* | 9/2009 | Saitoh | B81B 7/0061 257/419 |
| 2010/0048000 | A1* | 2/2010 | Kobayashi | H01L 21/6835 438/463 |
| 2014/0167226 | A1* | 6/2014 | Miccoli | G03F 7/70625 257/620 |
| 2017/0270345 | A1* | 9/2017 | Lundahl | G03F 7/16 |

* cited by examiner

*Primary Examiner* — Brian Werner
(74) *Attorney, Agent, or Firm* — Muncy, Geissler, Old & Lowe, P.C.

(57) ABSTRACT

A method for assembling a fingerprint identification module is provided. During the process of cutting the sensing strip, the thin junction slices between the fingerprint sensors are retained. Consequently, the size of the top surface of the fingerprint sensor is close to a predetermined size. After the thin junction slices are cut, the concave structures are formed on the bottom surfaces of the fingerprint sensors. Consequently, the size of the bottom surface of the fingerprint sensor is smaller than the size of the top surface of the fingerprint sensor. Even if the cutting skew is generated during the cutting process, the fingerprint sensor can pass the size test. Consequently, the production efficiency is enhanced.

13 Claims, 5 Drawing Sheets

METHOD FOR ASSEMBLING FINGERPRINT IDENTIFICATION MODULE AND FINGERPRINT SENSOR CUTTING METHOD

FIELD OF THE INVENTION

The present invention relates to an assembling method, and more particularly to a method for assembling a fingerprint identification module.

BACKGROUND OF THE INVENTION

Recently, a fingerprint identification technology has been applied to a variety of electronic products. By using the fingerprint identification technology, the user's fingerprint can be inputted into an electronic product and saved in the electronic product. For unlocking the electronic product, the user has to input the fingerprint through a fingerprint identification module. The way of unlocking the electronic product by the fingerprint identification technology is faster and more user-friendly than the way of manually inputting the password. Consequently, the fingerprint identification technology is favored by many users, and the demands on the fingerprint identification module are gradually increased.

Generally, a fingerprint identification module comprises a fingerprint sensor, a protective cover, a metallic ring and a circuit board. The fingerprint sensor is disposed on and electrically connected with the circuit board. The fingerprint sensor is used for sensing the user's finger and retrieving the information of the user's finger. The protective cover is used for covering the fingerprint sensor in order to protect the fingerprint sensor. The user's finger is only permitted to touch the protective cover. Since the user's finger is not directly contacted with the fingerprint sensor, the fingerprint sensor is not easily damaged. The metallic ring is sheathed around the protective cover. The metallic ring is used for transferring the charges of the user's finger in order to facilitate the operations of the fingerprint sensor.

A method of assembling a conventional fingerprint identification module will be described as follows. Firstly, the fingerprint sensor is placed on the circuit board, and the fingerprint sensor is electrically connected with the circuit board. Then, the protective cover is stacked on the fingerprint sensor, and the protective cover and the fingerprint sensor are adhered on each other. After the metallic ring is sheathed around the protective cover, the conventional fingerprint identification module is assembled.

In the above assembling method, the fingerprint sensor is obtained by cutting a sensing strip. A process of producing the fingerprint sensor will be described as follows. Firstly, the sensing strip is fixed on a base plate through an adhesive. Then, the sensing strip is cut to produce plural fingerprint sensors according to a predetermined size. The actual sizes of the plural fingerprint sensors are identical to or close to the predetermined size. In fact, the fingerprint sensor after the cutting procedure has a cutting tolerance.

FIG. 1 is a schematic view illustrating the structure of a conventional fingerprint sensor. As shown in FIG. 1, the size of a top surface 101 of the fingerprint sensor 10 is close to or nearly equal to the predetermined size. However, due to the cutting skew, the size of a bottom surface 102 of the fingerprint sensor 10 is possibly larger than the predetermined size. Although the size of the top surface 101 of the fingerprint sensor 10 is close to the predetermined size, the fingerprint sensor 10 is unable to pass the size test because the size of the bottom surface 102 of the fingerprint sensor 10 is larger than the predetermined size. Under this circumstance, the fingerprint sensor 10 is determined as unqualified product. As mentioned above, the sensing strip has to be fixed on the base plate through an adhesive during the process of producing the fingerprint sensor. After the cutting procedure is performed, residual fragments of the adhesive are readily remained on the fingerprint sensor. Since the residual fragments of the adhesive may adversely affect the operation of the fingerprint sensor, it is necessary to remove the residual fragments of the adhesive. The procedure of removing the residual fragments of the adhesive increases the time period of the overall fabricating process and reduces the fabricating efficiency.

Therefore, there is a need of providing a method for assembling a fingerprint identification module with high yield and high fabricating efficiency.

SUMMARY OF THE INVENTION

The present invention provides a fingerprint sensor cutting method with high yield and high fabricating efficiency.

The present invention also provides a method for assembling a fingerprint identification module with high yield and high fabricating efficiency.

In accordance with an aspect of the present invention, there is provided a fingerprint sensor cutting method. In a step (A), a sensing strip is cut according to a predetermined size, and thus plural unseparated fingerprint sensors are formed. The plural unseparated fingerprint sensors are connected with each other through thin junction slices. The thin junction slices are located near bottom surfaces of the plural unseparated fingerprint sensors. In a step (B), the cut sensing strip is turned upside down and the cut sensing strip is fixed on a fixing base, so that the bottom surfaces of the plural unseparated fingerprint sensors are exposed. In a step (C), the thin junction slices are cut off to produce plural individual fingerprint sensors and form plural concave structures in the bottom surfaces of the plural individual fingerprint sensors. Especially, a size of the bottom surface of each individual fingerprint sensor is smaller than the predetermined size.

In accordance with another aspect of the present invention, there is provided a method for assembling a fingerprint identification module. In a step (A), a sensing strip is cut according to a predetermined size, and thus plural unseparated fingerprint sensors are formed. The plural unseparated fingerprint sensors are connected with each other through thin junction slices. The thin junction slices are located near bottom surfaces of the plural unseparated fingerprint sensors. In a step (B), the cut sensing strip is turned upside down and the cut sensing strip is fixed on a fixing base, so that the bottom surfaces of the plural unseparated fingerprint sensors are exposed. In a step (C), the thin junction slices are cut off to produce plural individual fingerprint sensors and form plural concave structures in the bottom surfaces of the plural individual fingerprint sensors. Especially, a size of the bottom surface of each individual fingerprint sensor is smaller than the predetermined size. In a step (D), the individual fingerprint sensor and a circuit board are combined together, so that the fingerprint identification module is assembled.

From the above descriptions, the present invention provides a method for assembling a fingerprint identification module and a method of cutting a fingerprint sensor. During the process of cutting the sensing strip, the thin junction slices between the fingerprint sensors are retained. Consequently, the size of the top surface of the fingerprint sensor is close to the predetermined size or identical to the predetermined size. After the thin junction slices are cut, the concave structures are formed on the bottom surfaces of the fingerprint sensors. Consequently, the size of the bottom surface of the fingerprint sensor is smaller than the size of the top surface of the fingerprint sensor. As long as the size of the top surface of the fingerprint sensor is close to the predetermined size, the fingerprint sensor can pass the size test. Consequently, the production yield is increased. Moreover, since it is not necessary to use the adhesive and the procedure of removing the residual fragments of the adhesive is omitted, the production efficiency is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technologies, the present invention provides a method for assembling a fingerprint identification module and a fingerprint sensor cutting method.

Figure 1:
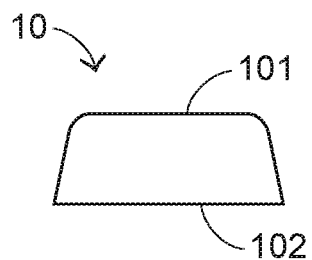
FIG. 1 is a schematic view illustrating the structure of a conventional fingerprint sensor.
Figure 2:
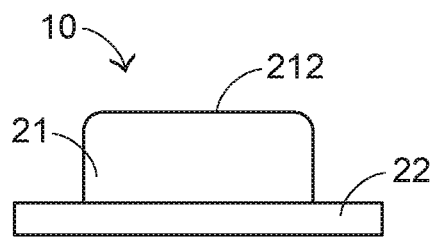
FIG. 2 is a schematic view illustrating a fingerprint identification module according to an embodiment of the present invention.

FIG. 2 is a schematic view illustrating a fingerprint identification module according to an embodiment of the present invention. As shown in FIG. 2, the fingerprint identification module 2 comprises a fingerprint sensor 21 and a circuit board 22. The fingerprint sensor 21 is fixed on the circuit board 22. In an embodiment, the fingerprint sensor 21 has a land grid array (LGA) package structure, and the circuit board 22 is a flexible printed circuit (FPC) or a rigid-flex board.

Figure 3A:
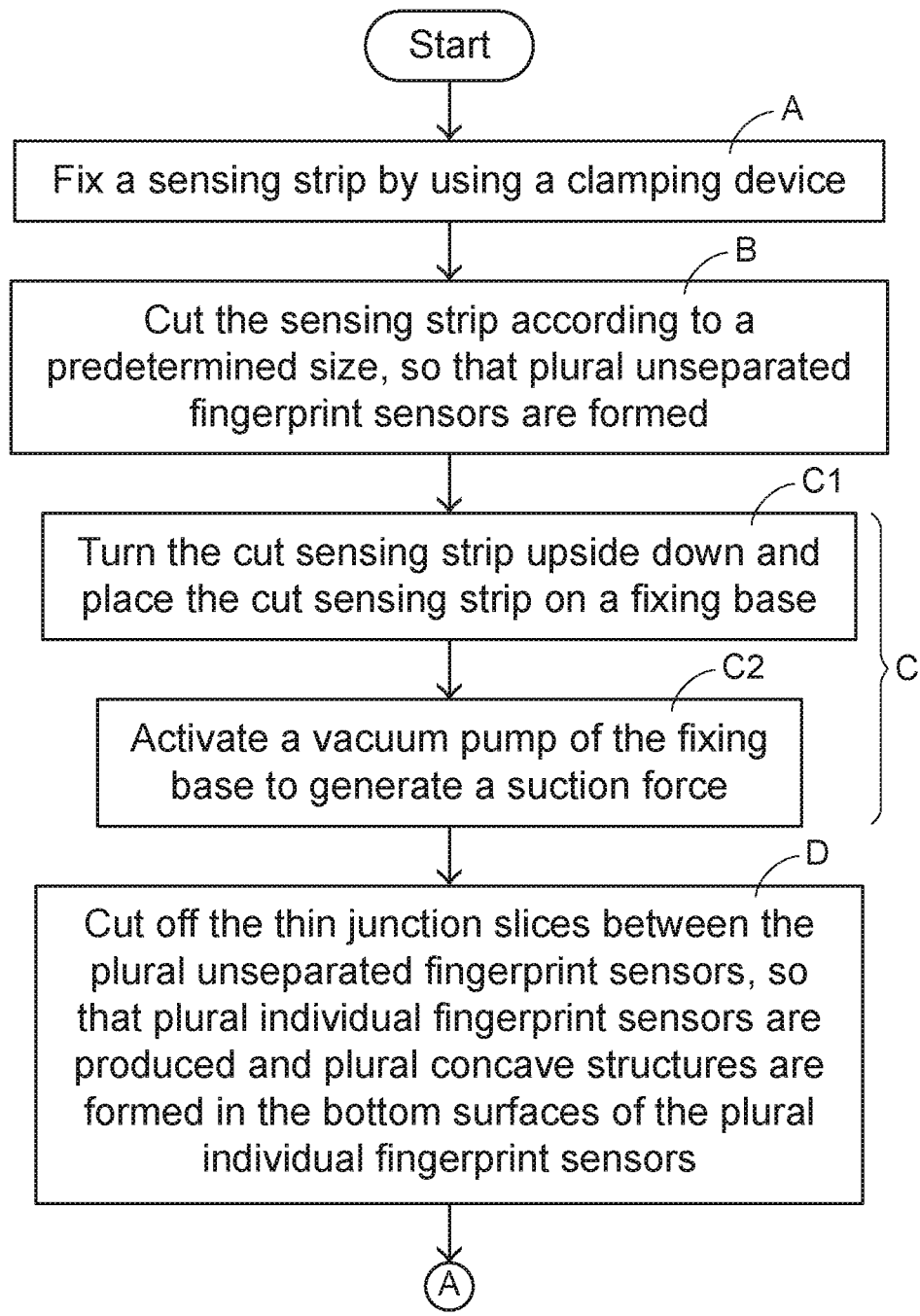
FIGS. 3A-3B schematically illustrate a flowchart of a method for assembling the fingerprint identification module according to the first embodiment of the present invention.
Figure 3B:
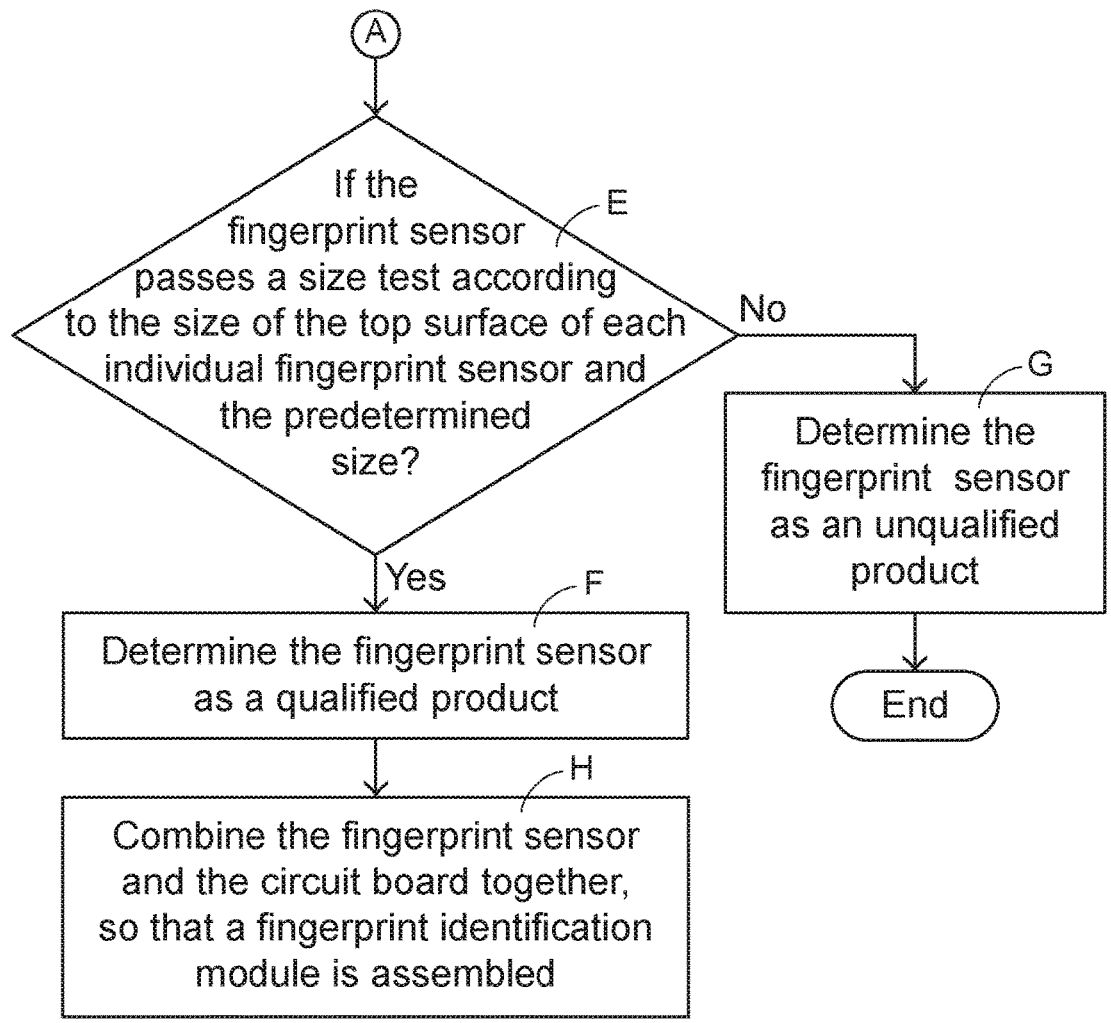

FIG. 3 schematically illustrates a flowchart of a method for assembling the fingerprint identification module according to the first embodiment of the present invention. The method comprises the following steps.

In a step A, a sensing strip is fixed by a clamping device.

In a step B, the sensing strip is cut according to a predetermined size, and thus plural unseparated fingerprint sensors are formed.

In a step C, the cut sensing strip is turned upside down and fixed on a fixing base, and thus the bottom surfaces of the plural unseparated fingerprint sensors are exposed.

In a step D, the thin junction slices between the unseparated fingerprint sensors are cut off, and thus plural individual fingerprint sensors are produced and plural concave structures are formed in the bottom surfaces of the plural individual fingerprint sensors.

The step E is performed to measure the size of the top surface of each individual fingerprint sensor and judge whether the individual fingerprint sensor passes a size test according to the predetermined size.

In a step F, the individual fingerprint sensor is determined as a qualified product.

In a step G, the individual fingerprint sensor is determined as an unqualified product.

In a step H, the individual fingerprint sensor and the circuit board are combined together, so that the fingerprint identification module is assembled.

The step C comprises steps C1 and C2. In the step C1, the cut sensing strip is turned upside down and placed on a fixing base, and the plural unseparated fingerprint sensors are partially accommodated within corresponding receiving recesses of the fixing base. In the step C2, a vacuum pump of the fixing base is activated to generate a suction force, and the plural unseparated fingerprint sensors are fixed in the corresponding receiving recesses in response to the suction force.

If the judging result of the step E indicates that the fingerprint sensors pass the size test, the step F is performed. Whereas, if the judging result of the step E indicates that the fingerprint sensors do not pass the size test, the step G is performed.

Figure 4:
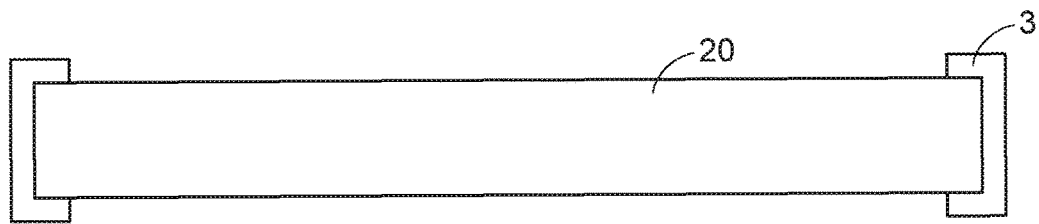
FIG. 4 is a schematic view illustrating a sensing strip of the fingerprint identification module according to the embodiment of the present invention.
Figure 5:
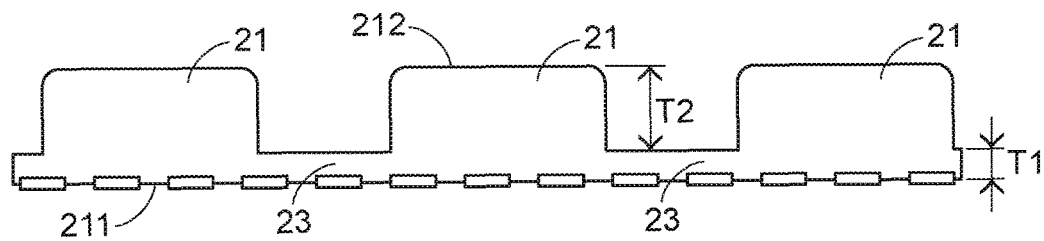
FIG. 5 is a schematic view illustrating the sensing strip of the fingerprint identification module after being cut.
Figure 6:
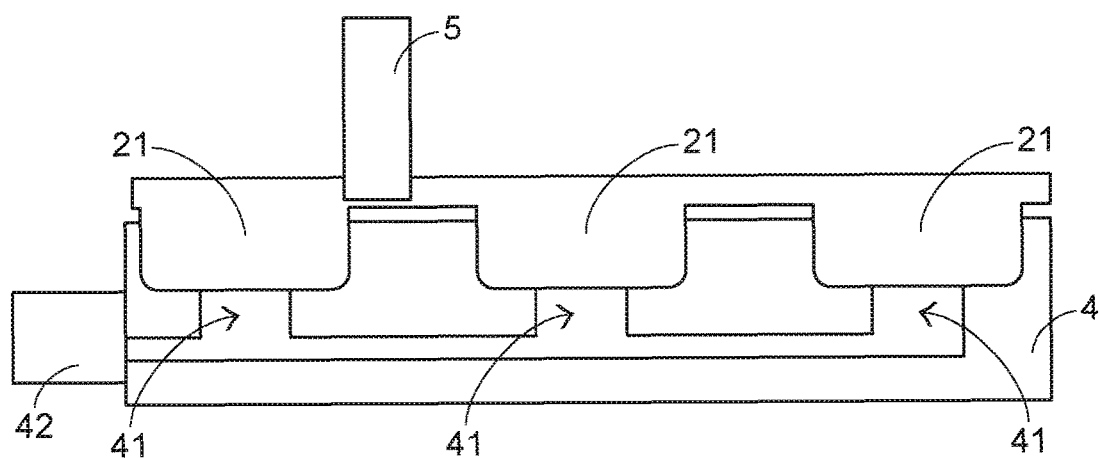
FIG. 6 is a schematic view illustrating the cut sensing strip of the fingerprint identification module that is fixed on a fixing base.
Figure 7:
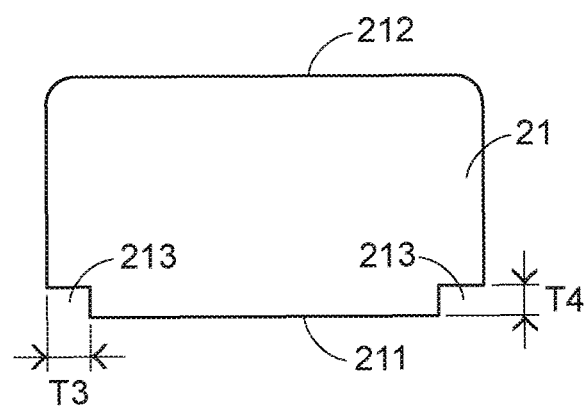
FIG. 7 is a schematic view illustrating a fingerprint sensor of the fingerprint identification module.

Hereinafter, the operations of the method for assembling the fingerprint identification module will be illustrated with reference to FIGS. 2-7. FIG. 4 is a schematic view illustrating a sensing strip of the fingerprint identification module according to the embodiment of the present invention. FIG. 5 is a schematic view illustrating the sensing strip of the fingerprint identification module after being cut. FIG. 6 is a schematic view illustrating the cut sensing strip of the fingerprint identification module that is fixed on a fixing base. FIG. 7 is a schematic view illustrating a fingerprint sensor of the fingerprint identification module.

After the method for assembling the fingerprint identification module in the production line is started, the step A is performed. As shown in FIG. 4, a sensing strip 20 is fixed by a clamping device 3. The clamping device 3 is operated by a manual force or a mechanical mechanism. Preferably, the clamping device 3 is operated by a mechanical mechanism. Consequently, the clamping device 3 can be operated in a fine and stable manner.

After the sensing strip 20 is fixed, the step B is performed. In a step B, the sensing strip 20 is cut according to a predetermined size, and thus plural unseparated fingerprint sensors 21 are formed. As shown in FIG. 5, every two adjacent unseparated fingerprint sensors 21 are connected with each other through a thin junction slice 23. The thin junction slices 23 are located near the bottom surfaces 211 of the plural unseparated fingerprint sensors 21.

In the step B, a cutting knife 5 as shown in FIG. 6 is used to cut the sensing strip 20 into the plural unseparated fingerprint sensors 21. The size of each unseparated fingerprint sensor 21 is close to the predetermined size. Particularly, the size of a top surface 212 of the unseparated fingerprint sensor 21 is close to the predetermined size. In this embodiment, a first length of the top surface 212 of the unseparated fingerprint sensor 21 is close to a first predetermined length of the predetermined size, and a first width of the top surface 212 of the unseparated fingerprint sensor 21 is close to a first predetermined width of the predetermined size. Preferably, after the sensing strip 20 is cut into the plural unseparated fingerprint sensors 21, the size of each unseparated fingerprint sensor 21 is identical to the predetermined size. In an embodiment, the thickness T1 of the thin junction slice 23 is about 0.15 mm, and the thickness T2 of the unseparated fingerprint sensor 21 (i.e., the distance between the top surface 212 of the unseparated fingerprint sensor 21 and the top surface of the thin junction slice 23 or the cut thickness of the sensing strip 20) is about 0.635 mm.

After the step B, the step C1 is performed. That is, the cut sensing strip 20 (or the plural unseparated fingerprint sensors 21) is turned upside down and placed on a fixing base 4. In addition, the plural unseparated fingerprint sensors 21 are partially accommodated within corresponding receiving recesses 41 of the fixing base 4. Then, the step C2 is performed. That is, a vacuum pump 42 of the fixing base 4 is activated to generate a suction force. In response to the suction force, the plural unseparated fingerprint sensors 21 are sucked into the corresponding receiving recesses 41. Meanwhile, as shown in FIG. 6, the bottom surfaces 211 of the plural unseparated fingerprint sensors 21 are exposed outside the fixing base 4. In this embodiment, the vacuum pump 42 is used for fixing the plural unseparated fingerprint sensors 21 in the corresponding receiving recesses 41. It is noted that the way of fixing the cut sensing strip 20 is not restricted. That is, various fixing means or fixing structures can be used to fix the cut sensing strip 20.

Then, the step D is performed. After the thin junction slices 23 between the plural unseparated fingerprint sensors 21 are cut, plural individual fingerprint sensors 21 are produced and plural concave structures 213 are formed in the bottom surfaces 211 of the individual fingerprint sensors 21. Meanwhile, the size of the bottom surface 211 of the individual fingerprint sensor 21 is smaller than the predetermined size. That is, a second length of the bottom surface 211 of the individual fingerprint sensor 21 is smaller than the first predetermined length of the predetermined size. As shown in FIG. 7, the length T3 of the concave structure 213 is about 0~0.1 mm, and the height T4 of the concave structure 213 is about 0.12~0.18 mm. Preferably, the length T3 of the concave structure 213 is 0 mm. Consequently, the length of the top surface 212 of the individual fingerprint sensor 21, the length of the bottom surface 211 of the individual fingerprint sensor 21 and the predetermined size are identical.

After the step D, the step E is performed. The step E is performed to measure the size of the top surface 212 of each individual fingerprint sensor 21 and judge whether the individual fingerprint sensor 21 passes the size test according to the predetermined size. That is, the step E is used to check whether the individual fingerprint sensor 21 is close to the predetermined size. If the difference between the size of the top surface 212 of the individual fingerprint sensor 21 and the predetermined size is smaller than or equal to an acceptable value, it means that the fingerprint sensor 21 passes the size test. Consequently, the individual fingerprint sensor 21 is determined as a qualified product (i.e., the step F). If the difference between the size of the top surface 212 of the individual fingerprint sensor 21 and the predetermined size is larger than the acceptable value, it means that the individual fingerprint sensor 21 does not pass the size test. Consequently, the individual fingerprint sensor 21 is determined as an unqualified product (i.e., the step G). The fingerprint sensor cutting method of the present invention includes the steps A~F (or G).

Then, the step H is performed. That is, the fingerprint sensor 21 and the circuit board 22 are combined together. Consequently, the fingerprint identification module 2 is produced. In an embodiment as shown in FIG. 2, the fingerprint sensor 21 is fixed on the circuit board 22 by a surface mount technology (SMT).

The following three aspects should be specially described. Firstly, gold balls, tin balls or any other appropriate electrically-conductive structures are formed on the bottom surface 211 of the fingerprint sensor 21 in order to make up for the height difference between the concave structure 213 and the bottom surface 211 of the fingerprint sensor 21.

Secondly, the fingerprint sensor 21 is fixed on the circuit board 22 by a surface mount technology (SMT). Since it is not necessary to use the adhesive, no residual fragments of the adhesive are readily remained on the fingerprint sensor. Since the procedure of removing the residual fragments of the adhesive is omitted, the production efficiency of the present invention is enhanced.

Thirdly, the conventional procedure of cutting the sensing strip usually results in the cutting skew of the fingerprint sensor. Due to the cutting skew, the size of the bottom surface of the fingerprint sensor is possibly larger than the size of the top surface of the fingerprint sensor, and the top surface of the fingerprint sensor is close to the predetermined size. Since the size of the bottom surface of the fingerprint sensor is larger than the predetermined size, the fingerprint sensor is unable to pass the size test. In accordance with the method of the present invention, the concave structure is formed on the bottom surface of the fingerprint sensor. Consequently, the size of the bottom surface of the fingerprint sensor is smaller than the size of the top surface of the fingerprint sensor, and the top surface of the fingerprint sensor is close to the predetermined size. Consequently, even if the cutting skew is generated during the cutting process, the fingerprint sensor can pass the size test.

From the above descriptions, the present invention provides a method for assembling a fingerprint identification module and a method of cutting a fingerprint sensor. During the process of cutting the sensing strip, the thin junction slices between the fingerprint sensors are retained. Consequently, the size of the top surface of the fingerprint sensor is close to the predetermined size or identical to the predetermined size. After the thin junction slices are cut, the concave structures are formed on the bottom surfaces of the fingerprint sensors. Consequently, the size of the bottom surface of the fingerprint sensor is smaller than the size of the top surface of the fingerprint sensor. As long as the size of the top surface of the fingerprint sensor is close to the predetermined size, the fingerprint sensor can pass the size test. Consequently, the production yield is increased. Moreover, since it is not necessary to use the adhesive and the procedure of removing the residual fragments of the adhesive is omitted, the production efficiency is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A fingerprint sensor cutting method, comprising steps of:
   (A) cutting a sensing strip according to a predetermined size, so that plural unseparated fingerprint sensors are formed, wherein the plural unseparated fingerprint sensors are connected with each other through thin junction slices, and the thin junction slices are located near bottom surfaces of the plural unseparated fingerprint sensors;

(B) turning the cut sensing strip upside down and fixing the cut sensing strip on a fixing base, so that the bottom surfaces of the plural unseparated fingerprint sensors are exposed, wherein the fixing base comprises a plurality of recesses respectively corresponding to the unseparated fingerprint sensors, and one of the recesses has a portion having a width less than a width of one of the unseparated fingerprint sensors, and a top surface of the one of the unseparated fingerprint sensors is in contact with the portion; and (C) cutting off the thin junction slices to produce plural individual fingerprint sensors and form plural concave structures in the bottom surfaces of the plural individual fingerprint sensors, wherein a size of the bottom surface of each individual fingerprint sensor is smaller than the predetermined size.

2. The fingerprint sensor cutting method according to claim 1, wherein in the step (A), a first length of the top surface of the unseparated fingerprint sensor is close to a first predetermined length of the predetermined size, and a first width of the top surface of the unseparated fingerprint sensor is close to a first predetermined width of the predetermined size.

3. The fingerprint sensor cutting method according to claim 1, wherein the step (B) comprises steps of:
(B2) activating a vacuum pump of the fixing base to generate a suction force.

4. The fingerprint sensor cutting method according to claim 1, wherein before the step (A), the fingerprint sensor cutting method further comprises a step (D) of using a clamping device to fix the sensing strip.

5. The fingerprint sensor cutting method according to claim 1, wherein in the step (C), a second length of the bottom surface of the individual fingerprint sensor is smaller than a first predetermined length of the predetermined size.

6. The fingerprint sensor cutting method according to claim 1, wherein after the step (C), the fingerprint sensor cutting method further comprises steps:
(E) measuring a size of the top surface of the individual fingerprint sensor and judging whether the individual fingerprint sensor passes a size test according to the predetermined size;
(F) if a difference between the size of the top surface of the individual fingerprint sensor and the predetermined size is smaller than or equal to an acceptable value, judging that the individual fingerprint sensor passes the size test; and
(G) if the difference between the size of the top surface of the individual fingerprint sensor and the predetermined size is larger than the acceptable value, judging that the individual fingerprint sensor does not pass the size test.

7. A method for assembling a fingerprint identification module, the method comprising steps of:
(A) cutting a sensing strip according to a predetermined size, so that plural unseparated fingerprint sensors are formed, wherein the plural unseparated fingerprint sensors are connected with each other through thin junction slices, and the thin junction slices are located near bottom surfaces of the plural unseparated fingerprint sensors;

(B) turning the cut sensing strip upside down and fixing the cut sensing strip on a fixing base, so that the bottom surfaces of the plural unseparated fingerprint sensors are exposed, wherein the fixing base comprises a plurality of recesses respectively corresponding to the unseparated fingerprint sensors, and one of the recesses has a portion having a width less than a width of one of the unseparated fingerprint sensors, and a top surface of the one of the unseparated fingerprint sensors is in contact with the portion;

(C) cutting off the thin junction slices to produce plural individual fingerprint sensors and form plural concave structures in the bottom surfaces of the plural individual fingerprint sensors, wherein a size of the bottom surface of each individual fingerprint sensor is smaller than the predetermined size; and (D) combining the individual fingerprint sensor and a circuit board together, so that the fingerprint identification module is assembled.

8. The method according to claim 7, wherein in the step (A), a first length of the top surface of the unseparated fingerprint sensor is close to a first predetermined length of the predetermined size, and a first width of the top surface of the unseparated fingerprint sensor is close to a first predetermined width of the predetermined size.

9. The method according to claim 7, wherein the step (B) comprises steps of:
(B2) activating a vacuum pump of the fixing base to generate a suction force.

10. The method according to claim 7, wherein before the step (A), the fingerprint sensor cutting method further comprises a step (E) of using a clamping device to fix the sensing strip.

11. The method according to claim 7, wherein in the step (C), a second length of the bottom surface of the individual fingerprint sensor is smaller than a first predetermined length of the predetermined size.

12. The method according to claim 7, wherein in the step (D), the individual fingerprint sensor is fixed on the circuit board by a surface mount technology, so that the fingerprint identification module is assembled.

13. The method according to claim 7, wherein after the step (C), the fingerprint sensor cutting method further comprises steps:
(F) measuring a size of the top surface of the individual fingerprint sensor and judging whether the individual fingerprint sensor passes a size test according to the predetermined size;
(G) if a difference between the size of the top surface of the individual fingerprint sensor and the predetermined size is smaller than or equal to an acceptable value, judging that the individual fingerprint sensor passes the size test; and
(H) if the difference between the size of the top surface of the individual fingerprint sensor and the predetermined size is larger than the acceptable value, judging that the individual fingerprint sensor does not pass the size test.

* * * * *